US010323769B2

(12) United States Patent
Vulkan

(10) Patent No.: US 10,323,769 B2
(45) Date of Patent: Jun. 18, 2019

(54) PRESSURE RELIEF VALVE

(71) Applicant: RAVAL A.C.S. LTD., Beer-Sheva (IL)

(72) Inventor: Omer Vulkan, D.N. Hanegev (IL)

(73) Assignee: RAVAL A.C.S. LTD., Beer-Sheva (IL)

(*) Notice: Subject to any disclaimer, the term of this patent is extended or adjusted under 35 U.S.C. 154(b) by 0 days.

(21) Appl. No.: 15/523,487

(22) PCT Filed: Nov. 4, 2015

(86) PCT No.: PCT/IL2015/051066
§ 371 (c)(1),
(2) Date: May 1, 2017

(87) PCT Pub. No.: WO2016/071906
PCT Pub. Date: May 12, 2016

(65) Prior Publication Data
US 2017/0314701 A1    Nov. 2, 2017

Related U.S. Application Data

(60) Provisional application No. 62/075,289, filed on Nov. 5, 2014.

(51) Int. Cl.
*F16K 24/00* (2006.01)
*F16K 31/128* (2006.01)
(Continued)

(52) U.S. Cl.
CPC ...... *F16K 31/128* (2013.01); *B60K 15/03519* (2013.01); *F16K 7/12* (2013.01);
(Continued)

(58) Field of Classification Search
CPC ......... Y10T 137/7771; Y10T 137/7772; Y10T 137/7777; Y10T 137/7778;
(Continued)

(56) References Cited

U.S. PATENT DOCUMENTS 3,441,050 A * 4/1969 Sanchez ............... F16K 17/196
                                                    137/493.6
3,971,406 A * 7/1976 Inada ............... B60K 15/03519
                                                    137/493.4
(Continued)

FOREIGN PATENT DOCUMENTS

CN      102486145 A      6/2012
CN      102529696 A      7/2012
(Continued)

OTHER PUBLICATIONS

International Search Report and Written Opinion from International Application No. PCT/IL2015/051066 dated Feb. 15, 2016.
(Continued)

*Primary Examiner* — Robert K Arundale
(74) *Attorney, Agent, or Firm* — Dorsey & Whitney LLP

(57) ABSTRACT

A pressure relief valve (10) is provided for controlling fluid flow between a first fluid path (12a) and a second fluid path (12b). The pressure relief valve includes a housing (14), a diaphragm member (24) movably affixed within the housing and having a fluid port (18), a first biasing member (20) for urging the diaphragm member in a first direction, and a sealing member (26) movably mounted in the housing and configured for reversibly sealing the fluid port (18). When a pressure at the second fluid path (12b) exceeds a first predetermined threshold the diaphragm member (24) is pushed against the first biasing member (20), and the sealing member (26) is initially urged towards the fluid port (18) and subsequently becomes disengaged with the fluid port, allowing fluid communication between the second fluid path (12b) and the first fluid path (12a) via the fluid port. When the pressure at the second fluid path (12b) decreases below a second predetermined threshold, the sealing member (26) becomes disengaged from the diaphragm member (24), allowing fluid communication between the first fluid path (Continued)

and the second fluid path via the fluid port. A valve assembly including the pressure release valve (10) and an externally actuated valve (60) is also provided.

22 Claims, 6 Drawing Sheets

(51) Int. Cl.
*B60K 15/035* (2006.01)
*F16K 7/12* (2006.01)
*F16K 15/18* (2006.01)
*F16K 17/04* (2006.01)
*G05D 16/06* (2006.01)
*G05D 16/20* (2006.01)
*B60K 15/03* (2006.01)

(52) U.S. Cl.
CPC .......... *F16K 15/185* (2013.01); *F16K 17/044* (2013.01); *G05D 16/0663* (2013.01); *G05D 16/2093* (2013.01); *B60K 2015/0359* (2013.01); *B60K 2015/03296* (2013.01); *B60K 2015/03302* (2013.01); *Y10T 137/7777* (2015.04)

(58) Field of Classification Search
CPC ........... Y10T 137/7779; Y10T 137/778; Y10T 137/87378; Y10T 137/87394; B60K 15/03519
USPC ........................................ 123/520
See application file for complete search history.

(56) References Cited

U.S. PATENT DOCUMENTS

| | | | |
|---|---|---|---|
| 4,317,467 A | | 3/1982 | Heyland et al. |
| 4,679,580 A | | 7/1987 | Devall et al. |
| 5,069,188 A | | 12/1991 | Cook |
| 5,174,265 A | * | 12/1992 | Sekine ................. F02M 25/089 123/516 |
| 5,211,151 A | * | 5/1993 | Nakajima ........ B60K 15/03519 123/516 |
| 5,509,395 A | | 4/1996 | Cook |
| 5,605,177 A | | 2/1997 | Ohashi et al. |
| 5,647,333 A | * | 7/1997 | Mukai ................... F02D 41/004 123/519 |
| 5,870,997 A | * | 2/1999 | Mukai .............. B60K 15/03504 123/516 |
| 6,006,781 A | * | 12/1999 | Brandt .................... F02M 37/22 137/493.6 |
| 6,196,258 B1 | | 3/2001 | Kanazawa et al. |
| 9,346,351 B2 | | 5/2016 | Onodera |
| 2006/0185652 A1 | | 8/2006 | Tsuge et al. |
| 2006/0207663 A1 | | 9/2006 | Tsuge |
| 2010/0269921 A1 | | 10/2010 | Pifer et al. |
| 2010/0275888 A1 | * | 11/2010 | Yuen .................. F02M 25/0836 123/520 |
| 2011/0162728 A1 | | 7/2011 | Pifer et al. |
| 2011/0284781 A1 | | 11/2011 | Keller et al. |
| 2012/0055943 A1 | | 3/2012 | Muller-Riederer et al. |
| 2012/0138610 A1 | | 6/2012 | Lee |
| 2013/0008537 A1 | | 1/2013 | Onodera et al. |
| 2013/0048890 A1 | | 2/2013 | Miura |
| 2013/0327424 A1 | | 12/2013 | Kishi et al. |
| 2015/0316007 A1 | | 11/2015 | Williams et al. |

FOREIGN PATENT DOCUMENTS

| | | |
|---|---|---|
| DE | 102010054960 A1 | 6/2012 |
| DE | 102011015999 A1 | 10/2012 |
| JP | 49021232 U1 | 2/1974 |
| JP | 2012524878 A | 10/2012 |
| JP | 2013204510 A | 10/2013 |
| RU | 2215222 C2 | 10/2003 |
| WO | 2010122414 A1 | 10/2010 |

OTHER PUBLICATIONS

International Search Report for International Application No. PCT/IL2015/050032 dated Jun. 5, 2015.

* cited by examiner

PRESSURE RELIEF VALVE

TECHNOLOGICAL FIELD

The presently disclosed subject matter relates to pressure relief valves in general, and in particular to pressure relief valves for fuel vapor systems.

BACKGROUND

Pressure release valves are well known, and are commonly used in fuel systems for opening at a preset pressure difference across the valve until the pressure difference is reduced to a preset level. For example, such valves allow fuel vapor to be vented from a fuel tank when the pressure in the fuel tank increases unacceptably above ambient.

Conventionally, such valves include a valve element configured for reversibly sealing against a valve seat, a sensing element such as a diaphragm or piston across which the pressure difference is to be regulated, and a reference force element, for example a spring, that sets the pressure difference at which the valve is to open.

GENERAL DESCRIPTION

According to a first aspect of the presently disclosed subject matter there is provided a pressure relief valve for controlling fluid flow between a first fluid path and a second fluid path, the pressure relief valve comprising:

a housing having a first port associated with said first fluid path, and a second port associated with said second fluid path, the housing defining therein a mechanical stop;

a diaphragm member movably affixed within the housing, and defining a fluid port for selectively providing therethrough fluid communication between the first fluid path and the second fluid path;

a first biasing member provided in said first fluid path and configured for urging said diaphragm member towards said mechanical stop in a first direction; and a sealing member provided in said second fluid path and movably mounted in said housing and having a sealing surface configured for reversibly sealing said fluid port, said sealing member having a second biasing member configured for urging said sealing surface towards said fluid port in a second direction, and wherein movement of said sealing member in said second direction is limited.

In particular, responsive to a first pressure at the second fluid path exceeding a first predetermined threshold said diaphragm member is pushed against said first biasing member, and said sealing member is urged towards said fluid port until the stop member limits the movement thereof whereby the sealing surface subsequently becomes disengaged with said fluid port allowing fluid communication between the second fluid path and the first fluid path via said fluid port. Furthermore, responsive to a second pressure at the second fluid path decreasing below a second predetermined threshold said sealing member is urged against said second biasing member while said diaphragm member is urged towards said mechanical stop whereby said sealing surface becomes disengaged with the diaphragm member allowing fluid communication between the first fluid path and the second fluid path via said fluid port. For example, said first direction is opposed to said second direction.

Additionally or alternatively, for example, the diaphragm member has a central portion and a peripheral portion, wherein the diaphragm member is affixed within said housing via said peripheral portion, and wherein said fluid port is provided in said central portion. For example, said central portion is reversibly movable with respect to said peripheral portion at least in said first direction.

Additionally or alternatively, for example, the valve further comprises a piston member interposed between said first biasing member and said diaphragm member, said piston member having an opening therethrough in registry with said fluid port.

Additionally or alternatively, for example, said mechanical stop is in the form of a cylindrical wall projecting into the housing from one end of the housing, and having an edge configured for being reversibly abutted onto by said diaphragm member. For example, said sealing member is accommodated within said cylindrical wall. For example, said cylindrical wall comprises stop elements for limiting movement of said sealing member in a direction opposed to said second direction.

Additionally or alternatively, for example, said sealing member comprises a stop member configured to limit said movement of said sealing member in said second direction. Additionally or alternatively, for example, said sealing member is kept in sealing engagement with the diaphragm member via the second biasing member so long as movement of said sealing member with respect to said housing is not terminated via said stop member.

Additionally or alternatively, for example, said diaphragm member is capable of moving in a direction away from the sealing member and disengaging therefrom after movement of said sealing member with respect to said housing is terminated via said stop member.

Additionally or alternatively, for example, said first biasing member is a first mechanical spring.

Additionally or alternatively, for example, said second biasing member is a second mechanical spring.

Additionally or alternatively, for example, said first predetermined threshold corresponds to having an overpressure in the second fluid path with respect to the first fluid path.

Additionally or alternatively, for example, said second predetermined threshold corresponds to having an underpressure in the second fluid path with respect to the first fluid path.

Additionally or alternatively, for example, said first biasing member, said diaphragm member and said sealing member are serially disposed and in axial alignment with respect to said housing.

Additionally or alternatively, for example, said first biasing member, said diaphragm member, said sealing member and said second biasing member are serially disposed and in axial alignment with respect to said housing.

Additionally or alternatively, for example, said first biasing member, said diaphragm member, said sealing member, said second biasing member, and said cylindrical wall are serially disposed and in axial alignment with respect to said housing.

Additionally or alternatively, for example, responsive to a pressure at the second fluid path exceeding a third predetermined threshold less than said first predetermined threshold, said diaphragm member is pushed against said first biasing member, and said sealing member is maintained urged towards said fluid port, wherein said third predetermined threshold is insufficient to displace the sealing member such that the stop member limits the movement thereof, whereby the sealing surface continues to seal said fluid port preventing fluid communication between the second fluid path and the first fluid path via said fluid port.

Additionally or alternatively, for example, said first fluid path provides fluid communication between a first reservoir, and said pressure relief valve, and wherein the second fluid path provides fluid communication between the pressure relief valve and a second reservoir. For example, said first reservoir comprises a vapor treating device and/or said second reservoir comprises a fuel tank.

According to another aspect of the presently disclosed subject matter there is provided a valve assembly having a first tubing connectable to a fuel vapor treating device and a second tubing connectable to a fuel tank, the valve assembly comprising:
  a pressure relief valve as defined according to the first aspect of the presently disclosed subject matter;
  an externally actuated valve; and
  a connector comprising a body having a first tubing connectable to the fuel vapor treating device, a second tubing connectable to the fuel tank, and having first seat for fitting the pressure relief valve thereto, and a second seat for holding the externally actuated valve therein.

For example, said first tubing defines a primary port and a bypass port, said bypass port being in fluid communication with the first fluid path defined by the housing of the pressure relief valve.

Additionally or alternatively, the second tubing is in fluid communication with the second fluid path.

Additionally or alternatively, the externally actuated valve is provided in said second fluid path and is operable to selectively open or close fluid communication between the tank and the fuel vapor treating device via said primary port.

Additionally or alternatively, for example, said externally actuated valve is configured to be actuated by an external energy source. For example, said externally actuated valve is an electromechanical valve. For example, said externally actuated valve comprises a solenoid having an armature selectively extending in and out of a solenoid body and a plunger mounted on said armature and being configured to sealingly engage said primary port. For example, said externally actuated valve is an electrically actuated solenoid valve.

Additionally or alternatively, for example, said externally actuated valve is configured for pulsed actuation by a controller thereby allowing pulsed fluid flow through a primary port thereof, disposed between said first tubing and said second tubing.

According to another aspect of the presently disclosed subject matter there is provided a pressure relief valve for controlling fluid flow between a first fluid path and a second fluid path. The pressure relief valve includes a housing, a diaphragm member movably affixed within the housing and having a fluid port, a first biasing member for urging the diaphragm member in a first direction, and a sealing member movably mounted in the housing and configured for reversibly sealing the fluid port. When a pressure at the second fluid path exceeds a first predetermined threshold the diaphragm member is pushed against the first biasing member, and the sealing member is initially urged towards the fluid port and subsequently becomes disengaged with the fluid port, allowing fluid communication between the second fluid path and the first fluid path via the fluid port. When the pressure at the second fluid path decreases below a second predetermined threshold, the sealing member becomes disengaged from the diaphragm member, allowing fluid communication between the first fluid path and the second fluid path via the fluid port. A valve assembly including the pressure release valve and an externally actuated valve is also provided.

According to another aspect of the presently disclosed subject matter there is provided a pressure relief valve for controlling fluid flow between a first fluid path and a second fluid path. The pressure relief valve comprising a piston member defining a fluid port therein extending between the first fluid path and the second fluid path and having a first biasing member configured to urge said piston member towards a wall portion. The pressure relief valve further includes a sealing member having a sealing surface configured to seal said fluid port, said sealing member having a second biasing member configured to urge said sealing surface towards said port, and further having a stop member configured to limit the movement of said sealing member towards said piston member.

According to at least one example of this aspect of the presently disclosed subject matter, the pressure relief valve is configured such that when pressure at the second fluid path exceeds a predetermined threshold said piston member is pushed against the forces of said first biasing member, and said sealing member is urged towards the port of said piston member until the stop member limits the movement thereof whereby the sealing surface disengages the port allowing fluid flow between the second fluid path and the first fluid path, and when pressure at the second fluid path drops below a predetermined threshold said sealing member is urged against the forces of said second biasing member while said port is urged towards said wall portion whereby said sealing surface disengages the port allowing fluid flow between the first fluid path and the second fluid path.

Any one or more of the following features and designs can be configured in a pressure relief valve according to at least one example of the presently disclosed subject matter, individually or in combinations thereof:
  The first biasing member can be a major spring and the second biasing member can be a minor spring wherein the major spring exerts forces greater than the forces exerted by the minor spring.
  The wall portion can be a cylindrical wall having a first edge defining an inner path, and the
  The piston member can further include a diaphragm coupled thereto and having an aperture coaxially disposed with the port.
  The stop member can be a pair of arms extending below the sealing surface each having a lateral protrusion configured to engage a second wall portion inside the valve thereby limiting the movement of the sealing member towards the piston member.
  The second wall portion can be a lateral wall extending from a second edge of the cylindrical wall.

According to a further aspect of the presently disclosed subject matter there is provided a pressure relief valve comprising a body having a first tubing connectable to a first reservoir and a second tubing connectable to a second reservoir being open to the atmosphere and an externally actuated valve disposed in said housing and being configured for pulsed actuation by a controller thereby allowing pulsed fluid flow between said first reservoir and said second reservoir. The body further includes a seat for holding a housing defining a first fluid path being in fluid communication with the first tubing and a second fluid path being in fluid communication with the second tubing. The housing includes a piston member defining a fluid port therein extending between the first fluid path and the second fluid path and having a first biasing member configured to urge said piston member towards a wall portion. The housing further includes a sealing member having a sealing surface configured to seal said fluid port, said sealing member having a second biasing member configured to urge said sealing surface towards said port, and further having a stop member configured to limit the movement of said sealing member towards said piston member.

The pressure relief valve is configured such that the externally actuated valve is configured to open thereby releasing pressure from the second reservoir. The pressure relief valve is further configured such that when pressure at the second reservoir exceeds a predetermined threshold said piston member is pushed against the forces of said first biasing member, and said sealing member is urged towards the port of said piston member until the stop member limits the movement thereof whereby the sealing surface disengages the port allowing fluid flow between the second reservoir and the first reservoir, and when pressure at the second reservoir drops below a predetermined threshold said sealing member is urged against the forces of said second biasing member while said port is urged towards said wall portion whereby said sealing surface disengages the port allowing fluid flow between the first reservoir and the second reservoir.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
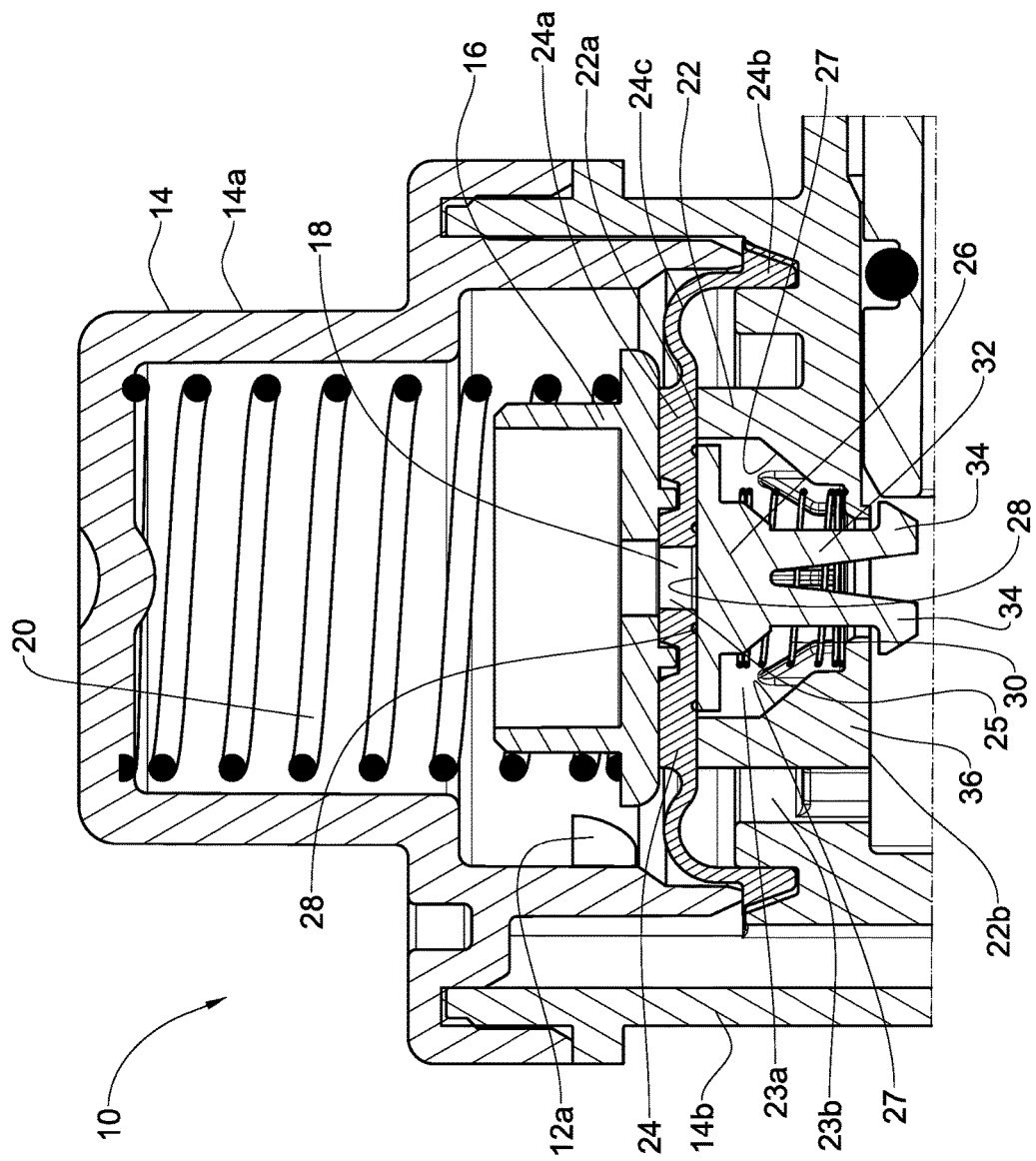
FIG. 1 is a side sectional view of the pressure relief valve in accordance with an example of the presently disclosed subject matter in a closed state.

Referring to FIGS. 1 to 4, a pressure relief valve according to a first example of the presently disclosed subject matter, is generally designated with reference numeral 10, and operates for selectively controlling fluid flow, i.e., fluid communication, between a first fluid path 12a and a second fluid path 12b. As will become clearer below, pressure relief valve 10 comprises a housing 14 accommodating a diaphragm member 24 having an aperture 25, which operates as a fluid port 18. The fluid port 18 is configured for providing selective fluid communication between the first fluid path 12a, which can include an inlet aperture formed in the housing 14, and the second fluid path 12b. The diaphragm member 24 essentially divides the housing 14 into a first housing portion 14a including at least a portion of the first fluid path 12a, and a second housing portion 14b including at least a portion of the second fluid path 12b.

The first fluid path 12a provides fluid communication between a first reservoir, for example a vapor treating device (also referred to herein as a canister), and the pressure relief valve 10 (in particular, the first housing portion 14a thereof), while the second fluid path 12b provides fluid communication between the pressure relief valve 10 (in particular, the second housing portion 14b thereof), and a second reservoir, for example a fuel tank.

The first housing portion 14a is configured for selectively biasing the diaphragm member 24 against a mechanical stop provided in the second housing portion 14b. The mechanical stop is also referred to herein interchangeably as a wall portion, and is defined in this example by first edge 22a of cylindrical wall 22. For this purpose, a first biasing member, here illustrated as a major mechanical spring 20, is configured to urge the diaphragm member 24 towards the wall portion, i.e. towards first edge 22a of and to abut with wall 22. For facilitating such urging, a piston member 16 is displaceably disposed in the first housing portion 14a, and the first biasing member, in this example the major spring 20, urges the piston member 16 against the diaphragm member 24, and thereby urges the diaphragm member 24 towards the wall portion defined inside second the housing portion 14b. In alternative variations of this example, the piston member 16 can be replaced with a disc, a plate, or a ring, for example, or can instead be omitted in which case the first biasing member or spring 20 directly abuts the diaphragm member 24.

In this example the piston member 16 defines an opening 17 in registry with aperture 25, and thus in registry with fluid port 18.

As mentioned above, the mechanical stop for the diaphragm member 24 is provided by the wall portion, which according to the present example is cylindrical wall 22 having first edge 22a, defining an inner path 23a. The cylindrical wall 22 is disposed inside the second housing portion 14b such that an outer path 23b is defined between the cylindrical wall 22 and the housing 14, in particular between the cylindrical wall 22 and the second housing portion 14b.

The cylindrical wall 22 disposed inside the housing coaxially with the diaphragm member 24, and thus also coaxially with the piston member 16 in this example, such that when the diaphragm member 24 abuts the first edge 22a of the wall portion 22, fluid flow between the inner path 23a and the outer path 23b is precluded.

According to the illustrated example the diaphragm member 24 is movably affixed within the housing 14. In particular, the diaphragm member 24 has a peripheral portion 24a connected to a central portion 24b via annular portion 24c. The peripheral portion 24a is fixedly mounted to the housing 14, and the central portion 24b is movable with respect to the peripheral portion 24a (via the annular portion 24c) and thus with respect to the housing 14. Thus, the diaphragm member 24, via the central portion 24b is capable of reversibly moving axially within the housing 14, i.e. in the forwards and backward directions. The aperture 25, and thus the fluid port 18, is located in the central portion 24b.

The diaphragm member 24 selectively allows or prevents fluid flow, i.e., fluid communication, between the first fluid path 12a and the second fluid path 12b. In order to allow the diaphragm member 24 to be alternately displaced away from and towards the wall portion 22 while concurrently the outer periphery thereof is fixed to the housing 14, the diaphragm member 24 is flexible, at least along annular portion 24c between the outer peripheral portion 24a, and the central portion 24b onto which the piston member 16 abuts.

The pressure relief valve 10 further includes a sealing member 26, also referred to interchangeably herein as a cap member, and having a sealing surface 28 configured to seal the fluid port 18 when engaged thereto. The sealing member 26 is movably mounted to the housing 14, and in particular is accommodated within the cylindrical wall 22. According to the present example the sealing surface 28 engages the portion of the diaphragm member 24 surrounding the port 18, thus the diaphragm member 24 and the sealing surface 28 are made of one or more materials having corresponding sealing properties. The sealing properties of the diaphragm member 24 and the sealing surface 28 can be determined in accordance with the fluid characteristics intended to flow through the pressure relief valve 10, the pressure level range, and the environment in which the pressure relief valve 10 is intended to be used. For example, if the pressure relief valve 10 is utilized to regulate pressure in a fuel vapor system, for example in the fuel system of a vehicle, the sealing properties are such which can withstand typical pressure level in fuel tank, as well as the chemical properties of the fuel.

The sealing member 26 includes a second biasing member, here illustrated as a minor mechanical spring 30, configured to urge the sealing surface 28 towards the port 18. The sealing member 26 further includes a stop member, here illustrated as a pair of arms 32 extending below the sealing surface 28 each having a lateral protrusion 34 configured to engage a second wall portion inside the pressure relief valve 10 thereby limiting the axial movement of the sealing member 26 towards the diaphragm member 24.

According to the illustrated example the second wall portion is a lateral wall 36 inwardly extending from a second edge 22b of the cylindrical wall 22 towards the inner path 23a. The cylindrical wall 22 thus defines an inner path 23a as extending between the first edge 22b at lateral wall 36 at the second edge thereof, and is configured to accommodate the sealing member 26 and to allow forwards and backwards displacement thereof inside the inner path 23a. The sealing member 26 is disposed inside the inner path 23a such that the sealing surface 28 is disposed at the first edge 22a or in the proximity thereof, and the lateral protrusion 34 is disposed out of the inner path 23a in close proximity to the lateral wall 36.

Figure 2:
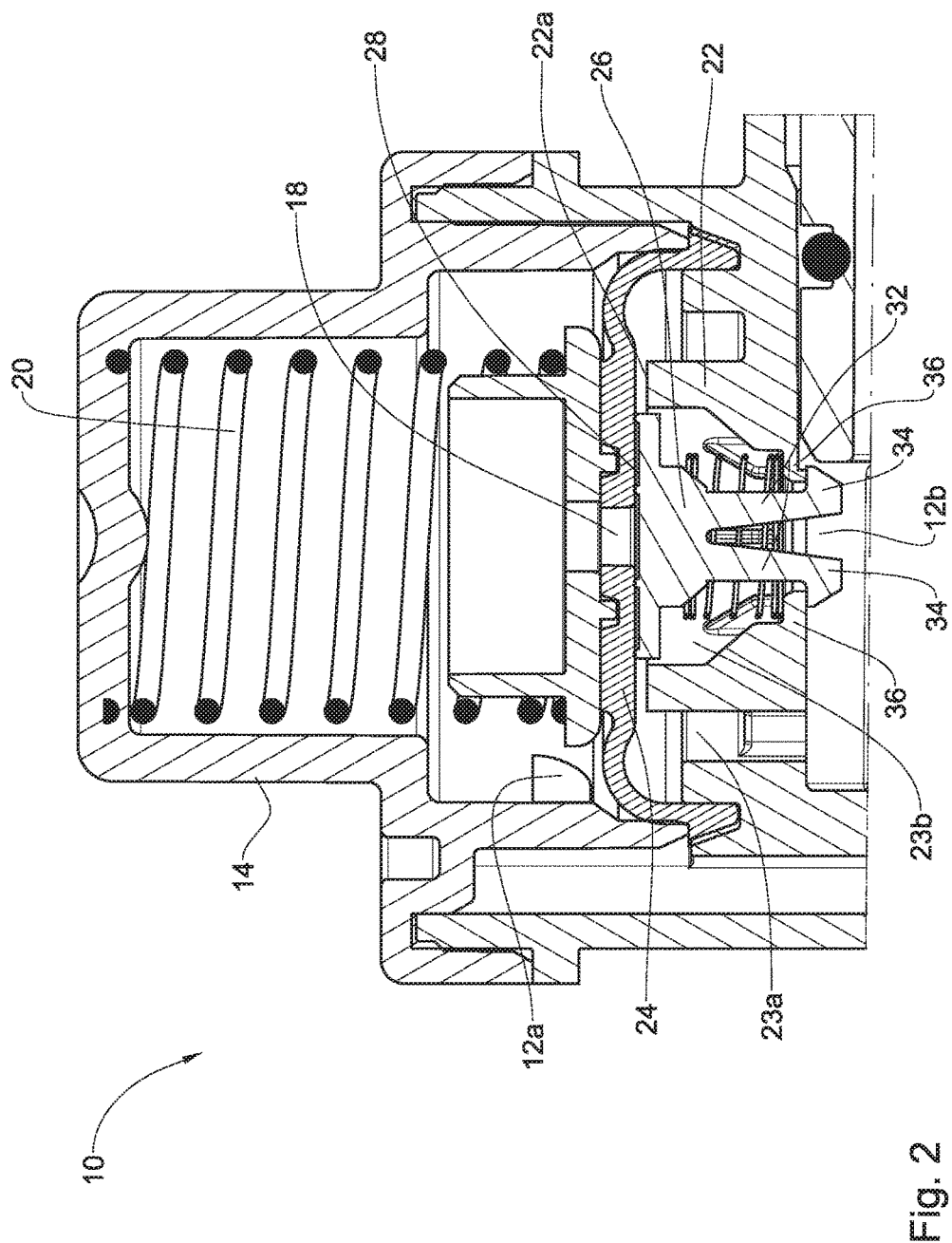
FIG. 2 is a side sectional view of the pressure relief valve of FIG. 1 in a partially overpressure opened state thereof.

Accordingly, and for a range of positions for the diaphragm member 24 including the positions illustrated in FIGS. 1 and 2, a forwards displacement of the sealing member 26 with respect to the second housing member 14b results in the engagement of the sealing surface 28 with the diaphragm member 24 thereby sealing the port 18. Furthermore, and referring to FIG. 4, a backwards displacement of the sealing member 26 with respect to the second housing member 14b results in disengagement of the sealing surface 28 and the diaphragm member 24 thereby allowing fluid flow through the port 18. Forwards axial displacement of the sealing member 26 is however limited by the engagement of the lateral protrusion 34 disposed outside the inner path 23a with the lateral wall 36, the purpose of which is explained hereinafter. Similarly, backwards axial displacement of the sealing member 26 is limited by stop member, which in this example is in the form of a slope portion 27 defined on the inner surface of the cylindrical wall 22. The slope portion 27 can include a diameter smaller than the diameter of the sealing surface 28, such that the displacement of the sealing member 26 is limited thereby. In alternative variations of this example, the slope portion can be replaced with a suitable radial projection, for example, to provide the function of the stop.

The lateral wall 36 can inwardly extend from the entire circumference of the cylindrical wall 22 limiting the movement of the arms 32 by engaging the lateral protrusion 34 thereof. Alternatively, the lateral wall 36 can extend from portions of the cylindrical wall 22, for example, portions corresponding to the location of the lateral protrusion 34.

According to the present example, sealing member 26 is biased in the forwards direction, and for this purpose a second biasing member, in the form of the minor spring 30 in this example, is disposed inside the inner path 23a and is configured to abut against an inner surface of the lateral wall 36, so as to urge the sealing member 26 towards the diaphragm member 24. The minor spring 30 is configured to urge sealing member 26 to seal the port 18 up to the point where the pressure difference between the pressure level at the second fluid path 12b drops below a predetermine threshold as compared with a pressure level at the first fluid path 12a.

In the illustrated example, the major spring 20 urging the diaphragm member 24 towards the cylindrical wall 22 exerts thereonto forces greater than the forces exerted the on the sealing member 26 by the minor spring 30. As a result, and as explained herein below, the pressure level required for opening the port 18 against the first biasing member, i.e., against major spring 20, to thereby displace the diaphragm member 24 in a backwards direction, is higher than that which is required for opening the port 18 by retracting the sealing member 26 against the second biasing member, i.e., the minor spring 30. Due to the fact that the direction of the forces exerted by the major spring 20 is opposite to the direction of forces exerted by the minor spring 30, the diaphragm member 24 can be utilized to regulate overpressure that may be present at the second flow path 12b, while the sealing member 26 can be utilized to regulate under pressure that may be present at the second flow path 12b.

Under normal operating conditions the valve 10 is in the closed position, as shown in FIG. 1, wherein diaphragm member 24 is urged forward by the major spring 20 via the piston member 16 such that the central portion 24b of the diaphragm member 24, about the port 18, abuts the first edge 22a of the cylindrical wall 22, preventing fluid flow between the outer path 23b and the inner path 23a. At this position, the sealing member 26 is concurrently urged forward by the minor spring 30, such that the sealing surface 28 abuts the diaphragm member 24, in particular the central portion 24b thereof, which covers the aperture 25 therein, and consequently seals the port 18. Since, as explained herein above, the direction of the forces exerted by the major spring 20 is opposite the direction of forces exerted by the minor spring 30, at this closed position, the sealing member 26 and the diaphragm member 24 are pushed towards one another thereby maintaining the port 18 in a sealed condition, and preventing flow communication between the first fluid path 12a and the second fluid path 12b.

It is appreciated that at this point, an increasing pressure at the second fluid path 12b (with respect to the pressure in the first fluid path 12a) further urges the sealing member 26 towards the diaphragm member 24, thus providing better engagement therewith and preventing fluid leaks through the port 18. As explained hereinafter, only when the pressure difference between the pressure at the second fluid path 12b and the pressure in the first fluid path 12a overcomes the forces of the major spring 20 the port 18 is opened. Accordingly, the valve 10 provides varying sealing engagement between the diaphragm member 24 and the sealing surface 28 for sealing the port 18, depending on the pressure difference between the second fluid path 12b and the first fluid path 12a. This way, under normal pressure the sealing surface 28 and the diaphragm member 24 can be held in the closed position with less force exerted thereon, preventing thereby damage thereto.

Reference is now made to FIG. 2. As the pressure difference between the second fluid path 12b and the first fluid path 12a increases to a predetermined threshold, i.e., to a point where the forces exerted thereby on the diaphragm member 24 are larger than the forces exerted by the major spring 20, the diaphragm member 24, in particular the central portion 24b thereof, is slightly moved backwards away from the first edge 22a of the cylindrical wall 22. The pressure gradient across the port 18 continues to urge the sealing member 26 forwards, thus maintaining the sealing engagement with the diaphragm member 24 and holding the port 18 in the closed position thereof. The sealing member 26 is free to be displaced forwards until the lateral protrusion 34 of the arms 32 engage the lateral wall 36 at the second edge 22b of the cylindrical wall 22. Thus, the length of the arms 22 and the cylindrical wall 22 determines the extent to which the sealing member 26 follows the diaphragm member 24 and holds the port 18 closed.

At this position, since the diaphragm member 24 disengages from the first edge 22a of the cylindrical wall 22 fluid can now flow between the outer path 23b and the inner path 23a.

Figure 3:
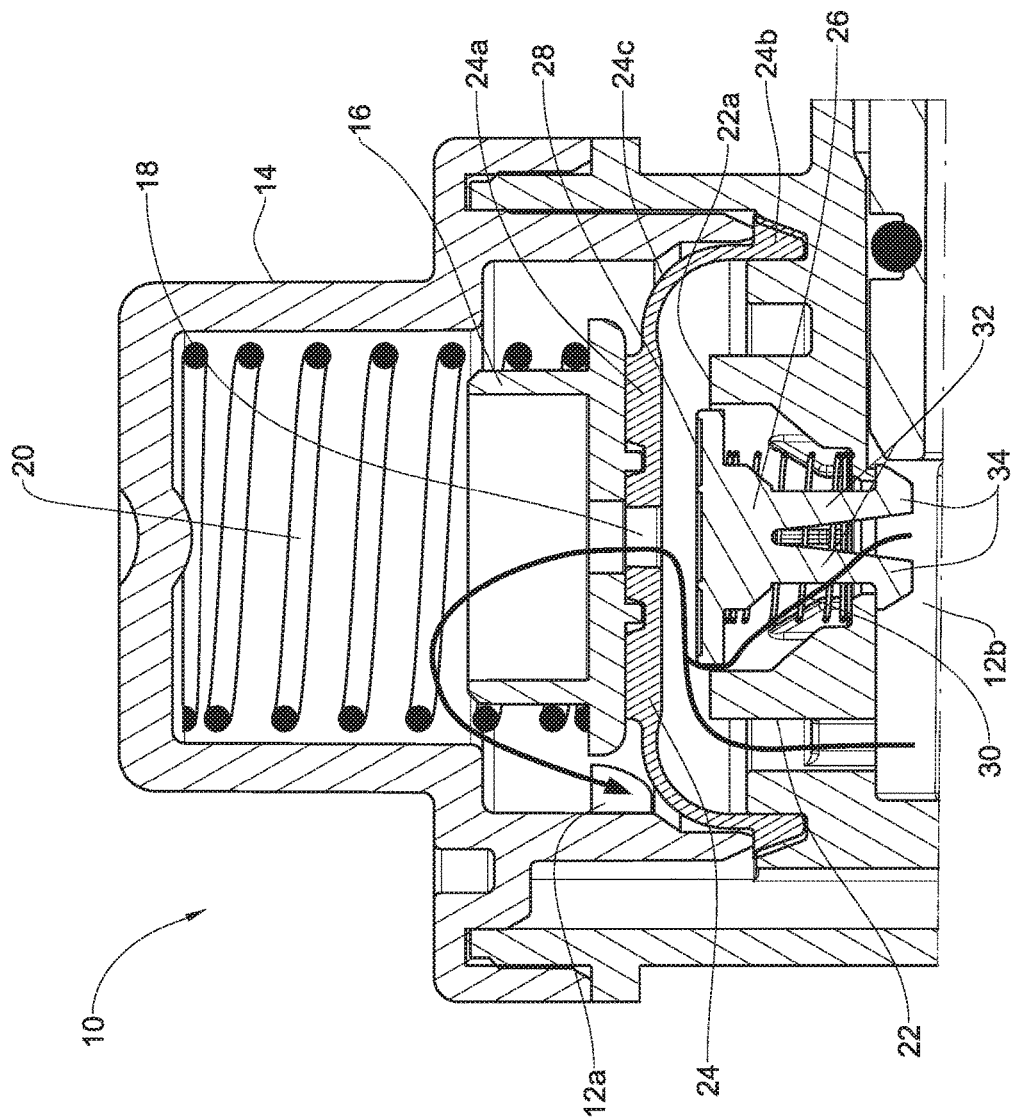
FIG. 3 is a side sectional view of the pressure relief valve of FIG. 1 in an overpressure opened state thereof.

As shown in FIG. 3, as the pressure difference between the second fluid path 12b and the first fluid path 12a further increases to another predetermined threshold, the diaphragm member 24, in particular the central portion 24b thereof, is further displaced backwards away from the first edge 22a of the cylindrical wall 22 to its retracted position. At this point however, the sealing member 26 is held back by the engagement of the lateral wall 36 and the lateral protrusion 34 of the arms 32, and forward displacement thereof is precluded. As a result, the sealing surface 28 sealing member 26 disengages the diaphragm member 24 allowing thereby fluid flow between the first fluid path 12a and second fluid path 12b through the port 18. The diaphragm member 24, in particular the central portion 24b thereof, is maintained in the retracted position thereof until the pressure gradient over the port 18 is smaller than the forces exerted by the major spring 20 on diaphragm member 24, in particular the central portion 24b thereof.

Figure 4:
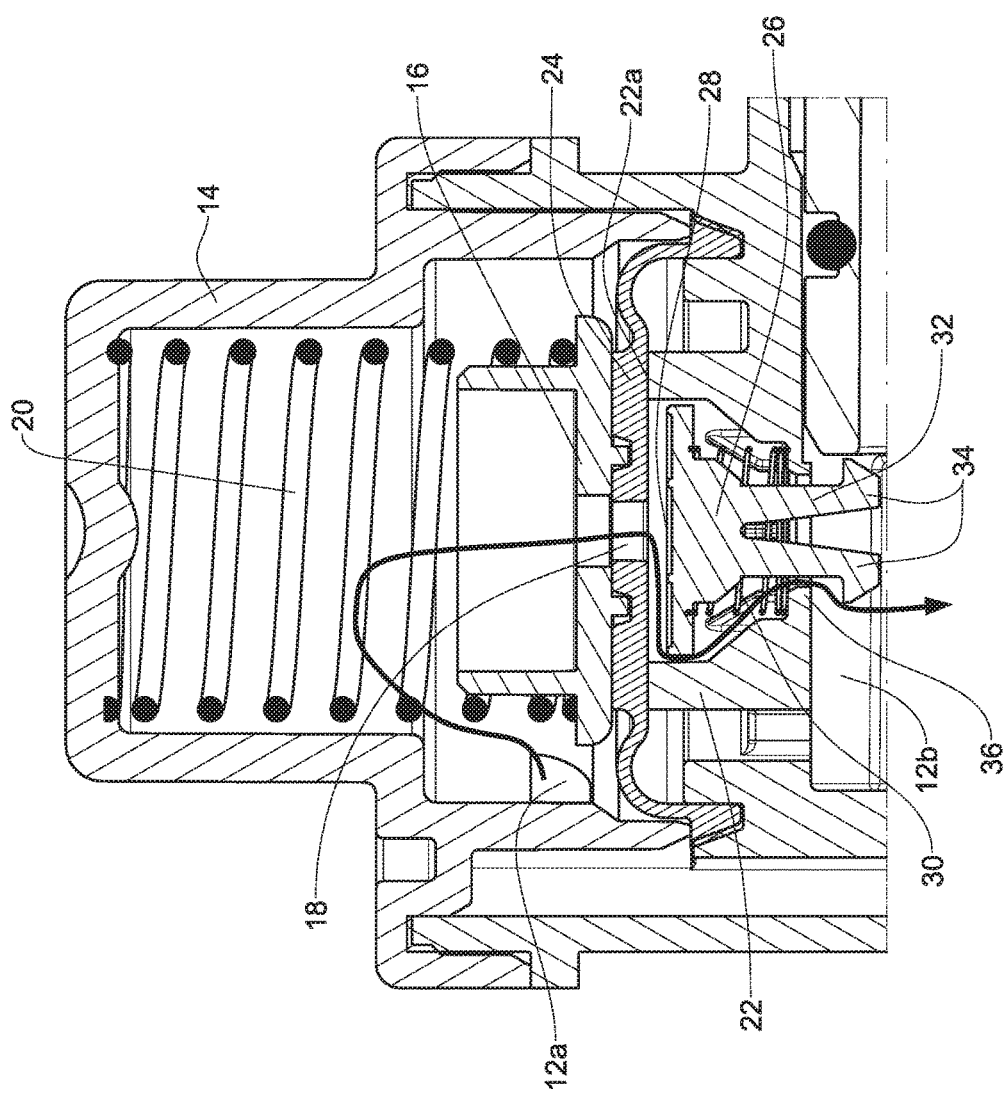
FIG. 4 is a side sectional view of the pressure relief valve of FIG. 1 in an under pressure opened state.

Attention is now directed to FIG. 4, illustrating a negative pressure gradient case in which the pressure level at the second fluid path 12b is lower than that at the first fluid path 12a, and wherein the diaphragm member 24 is urged towards the first edge 22a of the cylindrical wall 22 preventing thereby fluid flow between the outer path 23b and the inner path 23a. As the pressure difference between the pressure level at the second fluid path 12b and that at the first fluid path 12a drops below another predetermined threshold, at which the negative pressure gradient overcomes the forces exerted by the minor spring 30, the sealing member 26 is retracted backwards, disengaging thereby the diaphragm member 24, in particular the central portion 24b thereof. As a result the port 18 is opened allowing thereby fluid flow between the first fluid path 12a and the second fluid path 12b. It is to be noted that, according to the illustrated example, in an under-pressure condition (for example, the aforesaid negative pressure gradient case), as the sealing member 26 is retracted backwards, fluid flow is facilitated only through the inner path 23a, this is as opposed to an over pressure condition in which the piston member 16 is moved forward thereby facilitating fluid flow through both the inner path 23a and the outer path 23b.

It should be noted that in accordance with the presently disclosed subject matter a common port, i.e., fluid port 18, is utilized for regulating either over pressure or under pressure in the second fluid path 12b with respect to the first fluid path 12a, thus enabling reducing the manufacturing cost of the valve in at least some examples of the presently disclosed subject matter. In addition, the risk involved in a malfunction of the valve can also be reduced in at least some examples of the presently disclosed subject matter.

It is also to be noted that while in this example a single fluid port 18 provides selective fluid communication between the second fluid path 12b and the first fluid path 12a, in alternative variations of this example the single fluid port can be replaced with a plurality of apertures in the diaphragm member and/or in the piston member 16, wherein all such apertures are selectively closed or opened concurrently via the sealing member 26. It is also to be noted that in this example the first biasing member 20, the diaphragm member 24, the sealing member 26, said second biasing member 30, and the cylindrical wall 22 are serially disposed and in axial alignment with respect to said housing 14. However, other arrangements are possible: for example the first biasing member 20, the diaphragm member 24, the sealing member 26, are serially disposed and in axial alignment with respect to said housing 14; or the first biasing member 20, the diaphragm member 24, the sealing member 26, said second biasing member 30, are serially disposed and in axial alignment with respect to said housing 14.

Figure 5A:
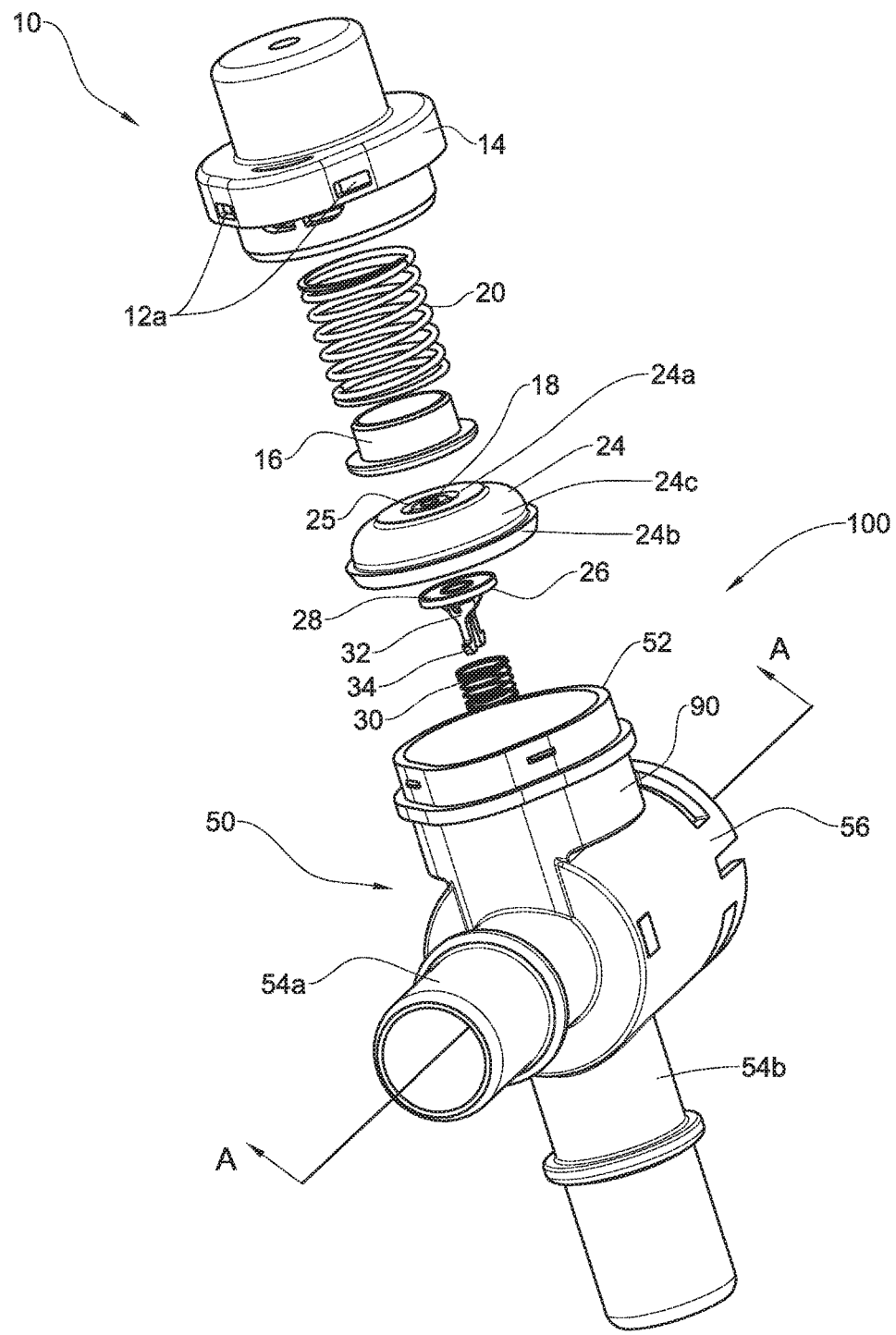
FIG. 5A is an isometric exploded view of a valve body having the pressure relief valve of FIG. 1 integrated therein.
Figure 5B:
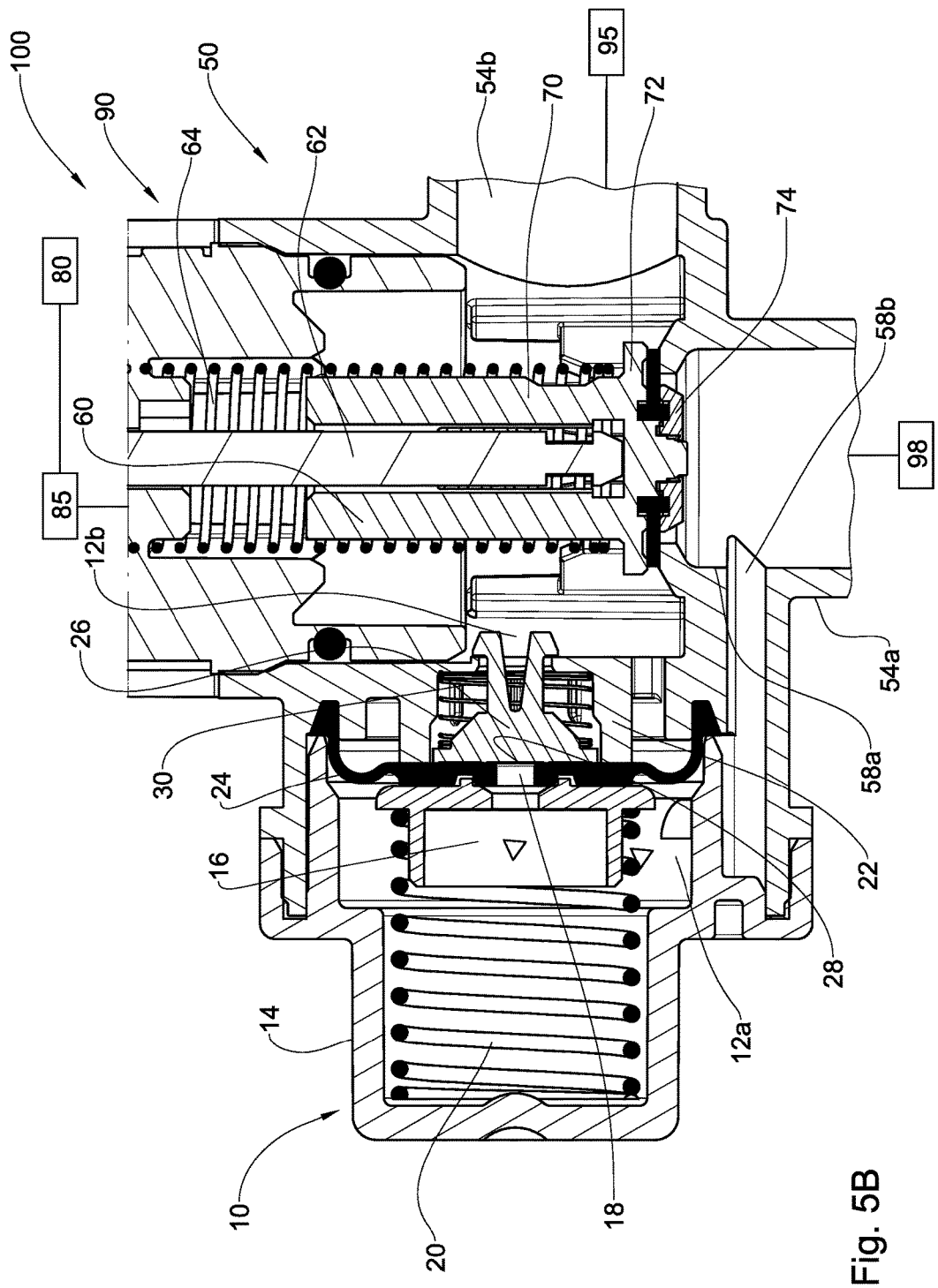
FIG. 5B is a side sectional view of the valve body of FIG. 5A having an externally actuated valve mounted therein.

Referring to FIGS. 5A and 5B, according to an example of the presently disclosed subject matter, the pressure relief valve 10 can be utilized in conjunction with an externally actuated valve (herein after EA valve), herein designated with reference numeral 60. The pressure relief valve 10 can be connected to the EA 60 via a connector 90 to provide valve assembly 100. The connector 90 comprises a body 50 having a first tubing 54a connectable to a first reservoir, a second tubing 54b connectable to a second reservoir, and having first seat 52 for fitting the pressure relief valve 10 thereto, and a second seat 56 for holding the EA 60 (shown in FIG. 5B) therein. The first tubing 54a defines a primary port 58a and a bypass port 58b, the bypass port 58b being in fluid communication with the first fluid path 12a defined by the housing 14 of the pressure relief valve 10. The second tubing 54b is in fluid communication with the second fluid path 12b.

The EA 60 can be configured to selectively open and close a primary port 58a extending between the first tubing 54a and second tubing 54b. The EA valve 60 can be configured for pulsed actuation by a controller (not shown) and it thus allows pulsed fluid flow through primary port 58a.

The EA valve 60 can be any valve which is actuated by an external energy source, as opposed to being actuated by the pressure difference between the first tubing 54a and the second tubing 54b. According to an example of the presently disclosed subject matter the EA valve 60 is an electromechanical valve, here illustrated as solenoid; in alternative variations of this example, the EA valve can instead be pneumatically actuated, or hydraulically actuated, or actuated by any other external source of energy.

In the present example, the EA valve 60 includes solenoid body 61 having an armature 62 selectively extending in or out of the solenoid body (not shown). The armature 62 can be biased by a solenoid spring 64 which is disposed such that the armature normally extends out of the solenoid body. The EA valve 60 further includes a plunger 70 having a plunger head 72 and a seal 74 configured to sealingly engage the primary port 58a. The plunger 70 is mounted on the armature 62 such that when the latter extends out of the solenoid body the plunger head 72 engages the primary port 58a preventing fluid flow therethrough.

According to an example, the EA valve 60 is activated by controller 85 which is adapted to receive electrical power from a vehicle alternator or from any other energy-storage device 80. The controller 85 can be configured to form a pulsed signal such which allows pulsed actuation of the solenoid as explained in detail hereinafter. The controller 85 can be configured to receive an actuation signal from the vehicle computer and can include a circuit board which forms a pulsed signal as required. The EA valve 60 can be configured to be normally close, and can be opened only in response to an actuation by the controller 85, for example, an electrical signal.

The EA valve 60 can be perpendicularly disposed with respect to the second tubing 54b. This way, in case the second tubing 54b is coupled to a fuel vapor outlet of a fuel tank 95, fluid flow from the tank 95 urges the plunger head 72 towards the primary port 58a, and the pressure inside the tank 95 facilitate maintaining the EA valve 60 in the closed position.

The following is a detailed explanation of an example of the operation of the pressure relief valve 10 as described in FIGS. 2 to 4 integrated with an EA 60 valve and being utilized within a fuel vapor system and mounted in a fuel vapor path between a fuel tank 95 and a vapor treating device 98, hereinafter referred to as a canister.

The EA valve 60 can be opened in response to a signal for example, an electric signal form the vehicle computer, and the pressure relief valve 10 can be open in response to a pressure gradient across the housing 14 larger than a predetermined gradient. That is to say, in the case where the second tubing 54b is coupled to a fuel tank 95 and the first tubing 54a is coupled to a canister, when the pressure at the tank 95 exceed a predetermined level the diaphragm member 24 of the pressure relief valve 10 can be opened so as to bring the pressure level in the tank 95 to the desired pressure range. Similarly, when the pressure at the tank 95 drops below a predetermined level the sealing member 26 can be opened so as to bring the pressure level in the tank 95 to the desired pressure range.

In a fully closed position the EA valve 60 and the port 18 are closed. In this position, the plunger head 72 of the EA valve 60 sealingly engages the primary port 58a and the diaphragm member 24 is urged forward by the major spring 20 towards the sealing member such that the sealing surface 28 abuts the diaphragm member 24, covers the aperture 25 therein, and consequently seals the port 18.

Thus, in this position, fuel vapor flow from the second tubing 54b to the first tubing 54a, and hence from the tank 95 to the canister is precluded. It is appreciated that is this position the plunger 70 operates under the force of the spring 64 urging the seal 74 on the primary port 58a. Thus, in this position there is no need for energy from an external source to energize the EA valve 60.

In the open position thereof however the EA valve 60 is opened while pressure relief valve 10 remains closed. In this position, the plunger head 72 of the EA valve 60 disengages the primary port 58a thereby allowing vapor flow from the tank 95 towards the canister. Opening the EA valve 60 is carried out in response to a pulsed signal from the controller 85 which in the case of a solenoid energizes a coil wrapped about the solenoid body thereby causing a pulsed displacement of the armature 62 away from the primary port 58a. At the end of each pulse the spring 64 forces the armature 62 and the plunger 70 to engage back the primary port 58a. Thus, as a result of the pulsed signal from the controller 85 a pulsed fluid flow is formed between the second tubing 54b and first tubing 54a. Hence, vapor flow from the tank 95 to the canister is allowed in a pulsed fashion, such that does not cause corking of the fuel vapor valve, which could otherwise become clogged by effect of the lift force that can otherwise be generated by the sudden high velocity vapor flow.

Accordingly, the pulsed signal can be configured with pulses having a wavelength and amplitude which allows a measured release of pressure, and is such as will not result in malfunction of other fuel vapor accessories. According to one example, each pulse can be at most 200 milliseconds long and can be repeated for 3 or 4 times or more with a gap of at least 200 milliseconds between the pulses.

It is appreciated that the controller 85 can be configured to provide signals to actuate the EA valve 60 on occasions when the fuel tank 95 is about to be opened, for instance before refueling thereof, where it is desired to release pressure from the fuel tank 95, and to bring it into pressure equilibrium with the atmosphere. Accordingly, the aforesaid pulses can be configured in accordance with the expected time since it is acknowledged that the vehicle's tank 95 is about be refueled until the opening of fuel tank 95 actual occurs. That is to say, if for example opening the fuel door is utilized as a trigger following which it is expected that the fuel tank 95 is to be opened, the time interval during which the pressure in the tank 95 is to be releases is the expected time between the opening of the fuel door and the actual opening of the fuel tank 95. According to some examples the expected time interval is 2 seconds, thus the pulsed signal is configured to allow substantially releasing the pressure from the tank 95 within 2 seconds.

According to the latter example, opening the fuel door can automatically send a signal to actuate the controller 85 which in return forms a pulsed signal to dictate the operation of the solenoid valve 60. It is appreciated that other triggers can be utilized, such which the actuation of the pulsed signal is carried out within a predetermined time interval prior to opening of the fuel tank 95.

It is further appreciated that once the pressure in the fuel tank 95 is released following the pulsed opening of the EA valve 60, the valve can be continuously opened without pulses, for example to allow refueling of the tank 95. It is thus appreciated that the amount of electric power required when forming the pulses can be higher than the amount of energy required to maintain the EA valve 60 in the continuous open position thereof. This is due to the fact that opening the EA valve 60 when the fuel tank 95 is under high pressure requires more energy than when maintaining the EA valve open once the pressure is released from the tank 95. Accordingly, the pulsed signal actuated by the controller 85 can include pulses having high voltage amplitude, while the last pulse following which the EA valve 60 remains opened the voltage amplitude can be lower. This way, overheating of the EA valve 60 is precluded.

As explained above with regards to FIG. 2, the pressure relief valve 10 can be opened in response to a high pressure at the second fluid path 12b, in the present example at the second tubing 54b, such as when pressure in the fuel tank 95 exceeds a predetermined level. At this position, the forces applied by the pressure within the tank 95 overcome the forces of the major spring 20 biasing the shaft piston member 16 and diaphragm member 24, and urging the sealing member 26 forwards until the lateral protrusion 34 of the arms 32 engage the lateral wall 36 at the second edge 22b of the cylindrical wall 22. Since the sealing member 26 is held by the engagement of the lateral wall 36 and the lateral protrusion 34 of the arms 32, further forward displacement thereof is precluded. Thus, the sealing surface 28 of the sealing member 26 disengages the diaphragm member 24 allowing thereby fluid flow between the second fluid path 12b and the first fluid path 12a through the port 18. Consequently, the pressure from within the tank 95 can be released by allowing vapor flow therefrom to pass through the second tubing 54b and the first tubing 54a towards the canister.

The diaphragm member 24 (together with the piston member 16) is maintained in the retracted position thereof until the force exerted by the pressure gradient over the port 18 is smaller than the forces exerted by the major spring 20.

It is appreciated that the operation of the pressure relief valve 10 can be configured as an emergency valve preventing overpressure in the tank 95 such which can cause damage to the tank 95. Thus under normal condition the pressure relief valve 10 remains closed.

Similarly, under normal conditions the EA valve 60 also remains closed under the forces of the spring 64 urging the seal 74 on the primary port 58a. Thus, as in the fully closed position there is no need for energy from an external source to energize the EA valve 60, and the pressure relief valve 10 can operate independently solely in response to the pressure in the tank 95.

The port 18 of the pressure relief valve 10 can be further opened in response to a low pressure in the second tubing 54b, such as when pressure in the fuel tank 95 drops below a predetermined level, for example when vacuum is formed in the tank 95. At this position the forces applied by the pressure within the tank 95 overcome the forces of the minor spring 30 biasing the sealing member 26 away from the port 18. In this position fluid flow through the port 18 is facilitated, thus allowing vacuum from within the tank 95 to be released.

Those skilled in the art to which the presently disclosed subject matter pertains will readily appreciate that numerous changes, variations, and modifications can be made without departing from the scope of the invention, mutatis mutandis.

The invention claimed is:

1. A pressure relief valve for controlling fluid flow between a first fluid path and a second fluid path, the pressure relief valve comprising:
    a housing including a first housing portion having a first port in fluid communication with said first fluid path, and a second housing portion having a second port in fluid communication with said second fluid path, the second housing portion defining therein a mechanical stop;
    a diaphragm member movably affixed within the housing, and defining a fluid port for selectively providing therethrough fluid communication between the first fluid path and the second fluid path;
    wherein the diaphragm member has a central portion and a peripheral portion, wherein the diaphragm member is affixed within said housing via said peripheral portion, and wherein said fluid port is provided in said central portion;
    a first biasing member provided in said first fluid path and configured for urging said diaphragm member towards said mechanical stop in a first direction;
    a piston member interposed between said first biasing member and said diaphragm member, said piston member having an opening therethrough in registry with said fluid port; and
    a sealing member provided in said second fluid path and movably mounted in said housing and having a sealing surface configured for reversibly sealing said fluid port, said sealing member having a second biasing member configured for urging said sealing surface towards said fluid port in a second direction, wherein said sealing member includes a stop member configured to limit said movement of said sealing member in said second direction;
    said stop member comprising arms extending below the sealing surface and configured for engaging with a wall portion at said end of the housing;
    wherein disengagement of said sealing surface from said diaphragm member allows:
        fluid flow from said first fluid path to said second fluid path via said fluid port; and
        fluid flow from said second fluid path to said first fluid path via said fluid port;
    wherein said mechanical stop is in the form of a cylindrical wall projecting into the housing from one end of the housing, and having an edge configured for being reversibly abutted onto by said diaphragm member;
    wherein the pressure relief valve has a closed position under normal operating conditions, wherein in said closed position:
        said diaphragm member abuts said mechanical stop, urged by said first biasing member; and
        said sealing member being urged by said second biasing member such that the sealing surface abuts said diaphragm member and sealing said fluid port;
    wherein responsive to a first pressure at the second fluid path exceeding a first predetermined threshold said diaphragm member is pushed against said first biasing member, and said sealing member is urged towards said fluid port and is sealingly engaged therewith until the stop member limits the movement thereof whereby the sealing surface subsequently becomes disengaged with said fluid port allowing fluid communication between the second fluid path and the first fluid path via said fluid port, wherein the sealing member is kept in sealing engagement with the diaphragm member via the second biasing member so long as movement of said sealing member with respect to said housing is not terminated via said stop member; and
    wherein responsive to a second pressure at the second fluid path decreasing below a second predetermined threshold said sealing member is urged against said second biasing member while said diaphragm member is urged towards said mechanical stop whereby said sealing surface becomes disengaged with the diaphragm member allowing fluid communication between the first fluid path and the second fluid path via said fluid port.

2. The pressure relief valve according to claim 1, wherein said first direction is opposed to said second direction.

3. The pressure relief valve according to claim 1, wherein at least one of the following:
    said central portion is reversibly movable with respect to said peripheral portion at least in said first direction;
    said sealing member is accommodated within said cylindrical wall; or
    said sealing member is accommodated within said cylindrical wall, and, wherein said cylindrical wall includes stop elements for limiting movement of said sealing member in a direction opposed to said second direction.

4. The pressure relief valve according to claim 1, wherein the diaphragm member is capable of moving in a direction away from the sealing member and disengaging therefrom after movement of said sealing member with respect to said housing is terminated via said stop member.

5. The pressure relief valve according to claim 1, wherein said first biasing member includes a first mechanical spring, and wherein second biasing member includes a second mechanical spring.

6. The pressure relief valve according to claim 1, wherein said first predetermined threshold corresponds to having an overpressure in the second fluid path with respect to the first fluid path, and wherein said second predetermined threshold corresponds to having an underpressure in the second fluid path with respect to the first fluid path.

7. The pressure relief valve according to claim 1, wherein at least one of the following:
   said first biasing member, said diaphragm member and said sealing member are serially disposed and in axial alignment with respect to said housing;
   said first biasing member, said diaphragm member, said sealing member, and said second biasing member are serially disposed and in axial alignment with respect to said housing; or
   said first biasing member, said diaphragm member, said sealing member, said second biasing member, and said cylindrical wall are serially disposed and in axial alignment with respect to said housing.

8. The pressure relief valve according to claim 1, wherein responsive to a pressure at the second fluid path exceeding a third predetermined threshold less than said first predetermined threshold, said diaphragm member is pushed against said first biasing member, and said sealing member is maintained urged towards said fluid port, wherein said third predetermined threshold is insufficient to displace the sealing member such that the stop member limits the movement thereof, whereby the sealing surface continues to seal said fluid port preventing fluid communication between the second fluid path and the first fluid path via said fluid port.

9. The pressure relief valve according to claim 1, wherein said first fluid path provides fluid communication between a first reservoir, and said pressure relief valve, and wherein the second fluid path provides fluid communication between the pressure relief valve and a second reservoir.

10. The pressure relief valve according to claim 9, wherein said first reservoir includes a vapor treating device.

11. The pressure relief valve according to claim 9, wherein said second reservoir includes a fuel tank.

12. A valve assembly having a first tubing connectable to a fuel vapor treating device and a second tubing connectable to a fuel tank, the valve assembly comprising:
   a pressure relief valve as defined in claim 1;
   an externally actuated valve; and
   a connector including a body having a first tubing connectable to the fuel vapor treating device, a second tubing connectable to the fuel tank, a first seat for fitting the pressure relief valve thereto, and a second seat for holding the externally actuated valve therein.

13. The valve assembly according to claim 12, wherein said first tubing defines a primary port and a bypass port, said bypass port being in fluid communication with the first fluid path defined by the housing of the pressure relief valve.

14. The valve assembly according to claim 12, wherein the second tubing is in fluid communication with the second fluid path.

15. The valve assembly according to claim 12, wherein the externally actuated valve is provided in said second fluid path and is operable to selectively open or close fluid communication between the tank and the fuel vapor treating device via said primary port.

16. The valve assembly according to claim 12, wherein said externally actuated valve is configured to be actuated by an external energy source.

17. The valve assembly according to claim 16, wherein said externally actuated valve includes an electromechanical valve.

18. The valve assembly according to claim 17, wherein said externally actuated valve includes a solenoid having an armature selectively extending in and out of a solenoid body, and a plunger mounted on said armature and being configured to sealingly engage said primary port.

19. The valve assembly according to claim 12, wherein said externally actuated valve includes an electrically actuated solenoid valve.

20. The valve assembly according to claim 12, further comprising a controller configured for actuating said externally actuated valve in a pulsed manner, thereby allowing pulsed fluid flow through a primary port thereof, disposed between said first tubing and said second tubing.

21. A pressure relief valve for controlling fluid flow between a first fluid path and a second fluid path, the pressure relief valve comprising:
   a housing including a first housing portion having a first port associated with said first fluid path, and a second housing portion having a second port associated with said second fluid path, the second housing portion defining therein a mechanical stop;
   a diaphragm member movably affixed within the housing, and defining a fluid port for selectively providing therethrough fluid communication between the first fluid path and the second fluid path;
   wherein the diaphragm member has a central portion and a peripheral portion, wherein the diaphragm member is affixed within said housing via said peripheral portion, and wherein said fluid port is provided in said central portion;
   a first biasing member provided in said first fluid path and configured for urging said diaphragm member towards said mechanical stop in a first direction;
   a piston member interposed between said first biasing member and said diaphragm member, said piston member having an opening therethrough in registry with said fluid port; and
   a sealing member provided in said second fluid path and movably mounted in said housing and having a sealing surface configured for reversibly sealing said fluid port, said sealing member having a second biasing member configured for urging said sealing surface towards said fluid port in a second direction, wherein said sealing member includes a stop member configured to limit said movement of said sealing member in said second direction;
   wherein disengagement of said sealing surface from said diaphragm member allows:
      fluid flow from said first fluid path to said second fluid path via said fluid port; and
      fluid flow from said second fluid path to said first fluid path via said fluid port;
   wherein said mechanical stop is in the form of a cylindrical wall projecting into the housing from one end of the housing, and having an edge configured for being reversibly abutted onto by said diaphragm member;
   wherein the pressure relief valve has a closed position under normal operating conditions, wherein in said closed position:
      said diaphragm member abuts said mechanical stop, urged by said first biasing member; and
      said sealing member being urged by said second biasing member such that the sealing surface abuts said diaphragm member and sealing said fluid port;
   said second flow path comprising an inner flow path through said cylindrical wall and an outer flow path outside of said cylindrical wall said sealing member being accommodated within said cylindrical wall and the sealing member being reciprocably displaceable with respect to said cylindrical wall inside the inner path;

wherein responsive to a first pressure at the second fluid path exceeding a first predetermined threshold said diaphragm member is pushed against said first biasing member, and said sealing member is urged towards said fluid port and is sealingly engaged therewith until the stop member limits the movement thereof whereby the sealing surface subsequently becomes disengaged with said fluid port allowing fluid communication between said inner flow path of the second fluid path and the first fluid path via said fluid port, and between said outer flow path of the second fluid path and the first fluid path via said fluid port, wherein the sealing member is kept in sealing engagement with the diaphragm member via the second biasing member so long as movement of said sealing member with respect to said housing is not terminated via said stop member; and wherein responsive to a second pressure at the second fluid path decreasing below a second predetermined threshold said sealing member is urged against said second biasing member while said diaphragm member is urged towards said mechanical stop whereby said sealing surface becomes disengaged with the diaphragm member allowing fluid communication between the first fluid path and the second fluid path via said fluid port.

22. The valve assembly according to claim 21, said stop member comprising arms extending below the sealing surface and configured for engaging with a wall portion at said end of the housing.

* * * * *